United States Patent [19]

Van Niekerk

[11] Patent Number: 5,072,479
[45] Date of Patent: Dec. 17, 1991

[54] INTEGRALLY MOLDED SWEEPING IMPLEMENT

[75] Inventor: Gerhard A. Van Niekerk, Pretoria, South Africa

[73] Assignee: Climbminster Limited, Manchester, United Kingdom

[21] Appl. No.: 538,666

[22] Filed: Jun. 15, 1990

[30] Foreign Application Priority Data

Jun. 26, 1989 [ZA] South Africa .................. 89/4819
Feb. 2, 1990 [ZA] South Africa .................. 90/0791

[51] Int. Cl.⁵ .............. A47L 13/12; A46B 1/00; A46B 9/02; B25G 3/14
[52] U.S. Cl. .............. 15/111; 15/159 R; 15/159 A; 15/176.6; 15/188; 403/361
[58] Field of Search ............. 15/186–188, 15/111, 146, 171, 176.1, 176.4–176.6, 145, 159 A, 159 R, 160; 403/263, 361

[56] References Cited

U.S. PATENT DOCUMENTS

| | | | |
|---|---|---|---|
| 2,065,584 | 12/1936 | Hempel | 15/188 |
| 2,177,149 | 10/1939 | Otto | 15/160 |
| 2,267,498 | 12/1941 | Foliot | 15/160 |
| 2,268,488 | 12/1941 | Keeys | 15/145 |
| 3,199,139 | 8/1965 | Vallis | 15/111 |
| 4,469,302 | 9/1984 | Stoudt | 403/361 |

FOREIGN PATENT DOCUMENTS

| | | | |
|---|---|---|---|
| 146134 | 4/1952 | Australia | 15/176.1 |
| 8281674 | 9/1983 | Australia . | |
| 675249 | 1/1940 | Fed. Rep. of Germany | 15/159 R |
| 2349580 | 4/1975 | Fed. Rep. of Germany | 15/160 |
| 1248028 | 10/1960 | France | 15/187 |
| 457688 | 5/1950 | Italy | 15/188 |
| 8000471 | 8/1981 | Netherlands . | |
| 29501 | 3/1919 | Norway | 15/111 |
| 82/6208 | 8/1982 | South Africa . | |
| 83/0038 | 1/1983 | South Africa . | |
| 83/7171 | 9/1983 | South Africa . | |
| 753521 | 7/1956 | United Kingdom | 15/188 |
| 806145 | 12/1958 | United Kingdom | 15/171 |
| 869929 | 6/1961 | United Kingdom | 15/187 |

*Primary Examiner*—Philip R. Coe
*Assistant Examiner*—C. Cooley
*Attorney, Agent, or Firm*—Berman & Aisenberg

[57] ABSTRACT

A sweeping implement is disclosed comprising an elongated head having an upper surface and a lower surface, a socket on the upper surface for attaching the head to a broomstick, and bristles projecting from the lower surface, wherein the head, the socket and the bristles are in the form of an integral moulding of a polymeric material and wherein the socket is provided with resiliently flexible retaining means on its inner surface for counteracting the removal of the broomstick from the socket. Some of the bristles may conveniently be of smaller diameter and others may conveniently be of larger diameter. The polymeric compound may comprise rubber and may be pre-formulated such that, upon vulcanization, the sweeping implement has a Shore hardness, as measured on the A scale, of between 35 and 65 and an elongation at break of between 550% and 650%.

7 Claims, 4 Drawing Sheets

INTEGRALLY MOLDED SWEEPING IMPLEMENT

FIELD OF THE INVENTION

This invention relates to an implement for sweeping a surface, such as a broom or a rake, and to a method of manufacturing such an implement.

BACKGROUND OF THE INVENTION

Brooms and rakes of various kinds are known. Their performance in terms of sweeping or raking efficiency varies widely as do their methods and costs of manufacture, their aesthetic appearance, their versatility of use, their durability and other characteristics.

Republic of South Africa Patents No's 82/6208 and 83/7181 disclose a broom head comprising an integrally moulded back portion and bristles. Socket means defining a socket can also be integrally moulded or can be attached after moulding. They also disclose an integrally moulded ridge which provides reinforcement.

Netherlands patent No 80 0 0471 discloses a broom comprising a broom head with a handle and at least one set of bristles. The head is formed in plastic and has the bristle cast in. It has an integral resilient socket for clamping on the end of the handle. The socket is preferably so arranged that air can escape when fitting the handle but is prevented from re-entering to resist removal. The head may have a scraper or wiper blade parallel to the row of bristles.

The aforementioned brooms suffer from the disadvantages of either poor durability or poor mouldability in an injection moulding process, or both. In an injection moulding process for instance, if all the parts of the broom are to be moulded integrally, different parts serving different functions and requiring different properties, have to be simultaneously moulded from the same material, and these sometimes conflicting objectives are difficult to achieve in practice.

In addition, some conventional brooms suffer from the poor durability of the connection provided between the head of the broom and the broomstick or handle. It is important that the aforementioned connection is sufficiently strong to absorb the shocks of everyday use of the broom without the head coming loose, yet at the same time the connection must not be so permanent that replacement of the head or the broomstick becomes impossible. Also, the cost of manufacture of the connection must not be too high.

There also exists a continuous need for the improvement of the sweeping performance of brooms. In this context it should be noted that, in order for a broom to be able to efficiently sweep small particles, it should have a large number of relatively thin bristles and in order for it to be able to efficiently sweep larger particles, it should have a sufficient number of relatively thick and more rigid bristles. Conventional brooms do not attempt to achieve both these objectives simultaneously.

OBJECTS AND SUMMARY OF THE INVENTION

It is an object of the invention to provide a sweeping implement comprising a socket which is easily connectable to a broomstick or handle but which is still strong and flexible enough to absorb the shocks of everyday use.

It is another object of the invention to provide a sweeping implement which is mouldable as an integral mould from a polymeric material.

It is a further object of the invention to provide a sweeping implement of improved sweeping or raking performance.

It is also an object of the invention to provide an improved method of manufacturing a sweeping implement.

Further objects and advantages of the invention will become apparent from a reading of the description and claims which follow.

According to one aspect of the invention, there is provided a sweeping implement comprising an elongated head having an upper surface and a lower surface, a socket on the upper surface for attaching the head to a broomstick, and bristles projecting from the lower surface, wherein the bristles, the socket and the head are in the form of an integral moulding of a polymeric material and wherein the socket is provided with resiliently flexible retaining means on its inner surface for counteracting the removal of the broomstick from the socket.

The head may further include webs on opposite sides of the socket, extending between the socket and the head and being integrally moulded with the head and the socket.

The head may have a substantially rectangular shape.

The retaining means may comprise at least one substantially frustoconically shaped ring tapering towards the base of the socket, and being adapted to exercise a suction grip on the end of a broomstick inserted into the socket when an attempt is made to remove the broomstick from the socket. So as to promote rigidity of the connection between the broomstick and the socket, the retaining means may comprise at least two substantially frusto-conically shaped rings tapering towards the base of the socket.

The bristles may be of different thicknesses. Thus, the implement may comprise thinner bristles suitable for sweeping particles of smaller individual mass and thicker bristles for sweeping particles of larger individual mass and for supporting the thinner bristles in use. The thinner and thicker bristles are preferably all of substantially the same length. The thinner bristles may promote the development of static electricity which in turn may cause the individual bristles to be charged and to attract dirt particles. Such dirt particles may then subsequently be removed by rinsing the sweeping implement under running water.

The thicker bristles may impart to the sweeping implement the properties of a rake, whilst the thinner bristles may impart to the sweeping implement the properties of a broom.

To facilitate sweeping, the bristles of the sweeping implement may be arranged in rows. Preferably, thicker bristles are arranged in first rows whilst thinner bristles are arranged in second rows, the second rows alternating with the first rows.

Conveniently, thicker bristles of one first row are staggered in relation to thicker bristles of adjacent first rows. The thinner bristles of one second row are preferably not staggered with respect to thinner bristles of another second row, but are arranged opposite one another. As an alternative, the thicker bristles may be arranged in one or more first rows located along one of the long sides of the head and the thinner bristles may be arranged in a plurality of second rows located on the remainder of the lower surface. The thinner bristles of one such second row may be staggered with respect to the thinner bristles of adjacent rows. I have found that by combining thinner bristles and thicker bristles, the sweeping performance of the implement can be improved beyond expectation.

The bristles may be substantially cylindrically or frusto-conically shaped, having a circular cross-section. In the latter case they are preferably tapered in a direction away from the head, so as to facilitate their removal from a mould when they are manufactured. The distal edges of the bristles are conveniently chamfered.

The head conveniently comprises a stiffening member which may be made of a material such as spring steel or mild steel or else a suitable polymeric material, such as polyethylene, polypropylene or other plastics materials. Alternatively, a fibrous material such as glass fibre or asbestos or even a synthetic fibrous material may be used. For the sake of convenience in using the implement, the stiffening member should preferably be made of a material of which the strength to weight ratio is high.

The stiffening member is preferably embedded in the head and extends along its length.

The head may conveniently be provided with a longitudinally extending transversely projecting blade, which may also be integrally moulded with the head, the socket and the bristles. The blade may be provided with angled corners at its free or distal side and such angles may be acute, in order to facilitate cleaning in corners. The angles are preferably in the range of between 45° and 90°, preferably between 50° and 75°, more preferably about 60°.

The sweeping implement is preferably made of a suitable polymeric material such as a rubber compound of which the composition may be predetermined such that, upon vulcanisation, all the desired properties of the implement are obtained, including Shore hardness, stiffness, wear resistance, electrical conductivity (to control the implement's tendency to develop static electricity) and aesthetic appearance.

In preparing different rubber compound formulations so as to test their effect on the properties of the finished product after vulcanization, I have found that Shore hardness and elongation at break play important roles in defining the desirable properties of the broom in terms of its mouldability in an injection moulding process, its sweeping and/or raking performance and its longevity.

I have found that a Shore hardness (as measured on the A scale) of between 35 and 65, preferably around 55, yields good results. If the hardness of the implement exceeds 65, it becomes brittle and its electrical conductivity becomes unacceptably high for some applications. A hardness below 35 results in an implement of which the sweeping or raking performance is unsatisfactory, due to its excessive flexibility.

Another important parameter of the implement is its elongation at break. As compared with other rubber products, the compound has to be formulated such as to have a rather high yield strength or elongation at break when vulcanized. I have found that an elongation at break of between about 550% and about 650% is required to yield good results in terms of mouldability (especially in view of the desirability to manufacture it as an integral mould) and sweeping or raking performance. The preferred value for elongation at break is around 600%.

The electrical conductivity of the implement is also important, because of its effect on the tendency of the implement to develop static electricity. Thus, for example, where the implement is to be used in potentially explosive atmospheres such as in petroleum refineries or in the petrochemicals or explosives industries, the compound may be formulated to give a higher Shore hardness and/or may include particles of a metal whose electrical conductivity is high. Conversely, where the implement is to be used under dry circumstances in safe atmospheres, its formulation may be prepared so as to promote the development of static electricity.

The invention also extends to a method of manufacturing a sweeping implement, including the steps of
forming the implement by injection moulding using a rubber compound, the implement comprising an elongated head having an upper surface and a lower surface, a socket on the upper surface for attaching the head to a broomstick, and bristles projecting from the lower surface, wherein the bristles, the socket and the head are in the form of an integral moulding of a polymeric material and wherein the socket is provided with resiliently flexible retaining means on its inner surface for counteracting the removal of the broomstick from the socket; and
vulcanizing the rubber compound;
the rubber compound being formulated so as to impart to the implement upon vulcanization thereof a Shore hardness (as measured on the A scale) of between 35 and 65. The rubber compound may be formulated so as to impart to the implement, upon vulcanization, an elongation at break of between 550% and 650%.

BRIEF DESCRIPTION OF THE DRAWINGS

The invention will now be described, by way of example, with reference to the accompanying drawings in which.

DETAILED DESCRIPTION OF THE DRAWINGS

Figure 1:
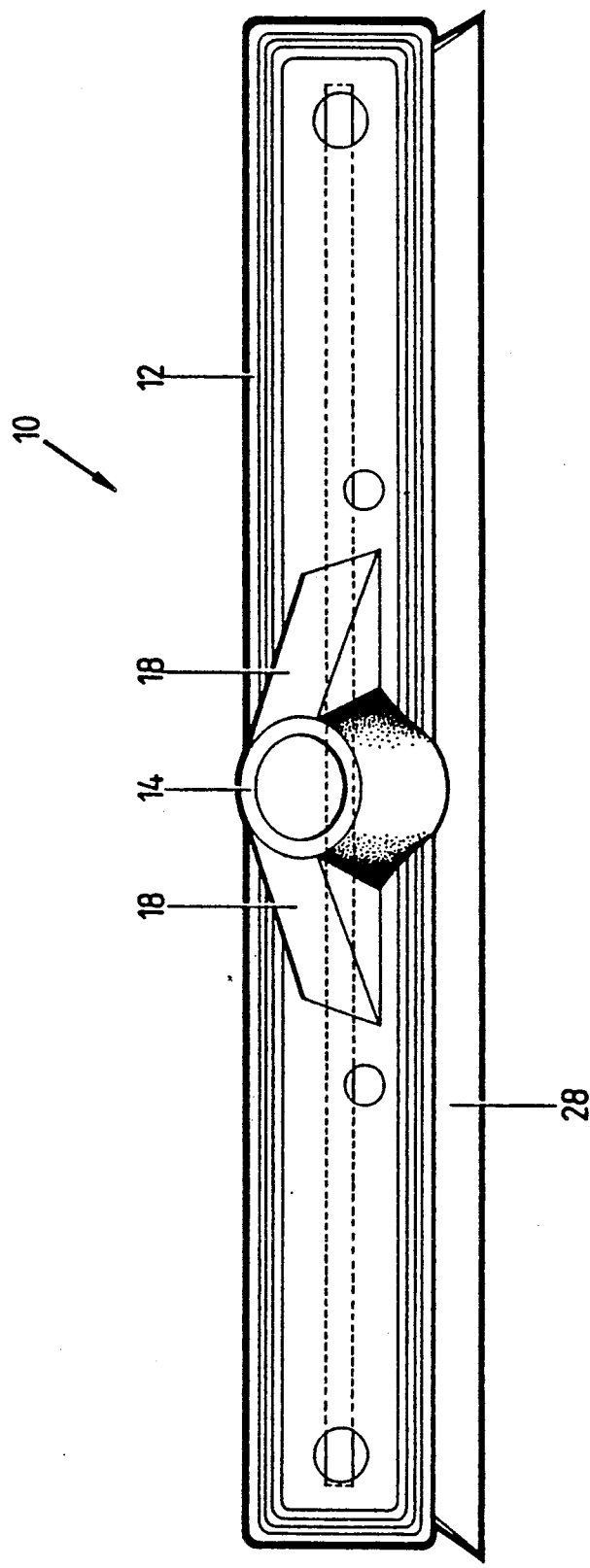
FIG. 1 is a plan view of a broom in accordance with the invention.

Referring to the drawings, reference numeral 10, 10' generally indicates a broom comprising a head 12, 12' provided with a socket 14 for a broomstick (not shown) on its upper side and bristles 16, 16', 26, 26' on its under side.

Webs 18 are provided on opposite sides of the socket 14 for strengthening purposes.

Figure 2:
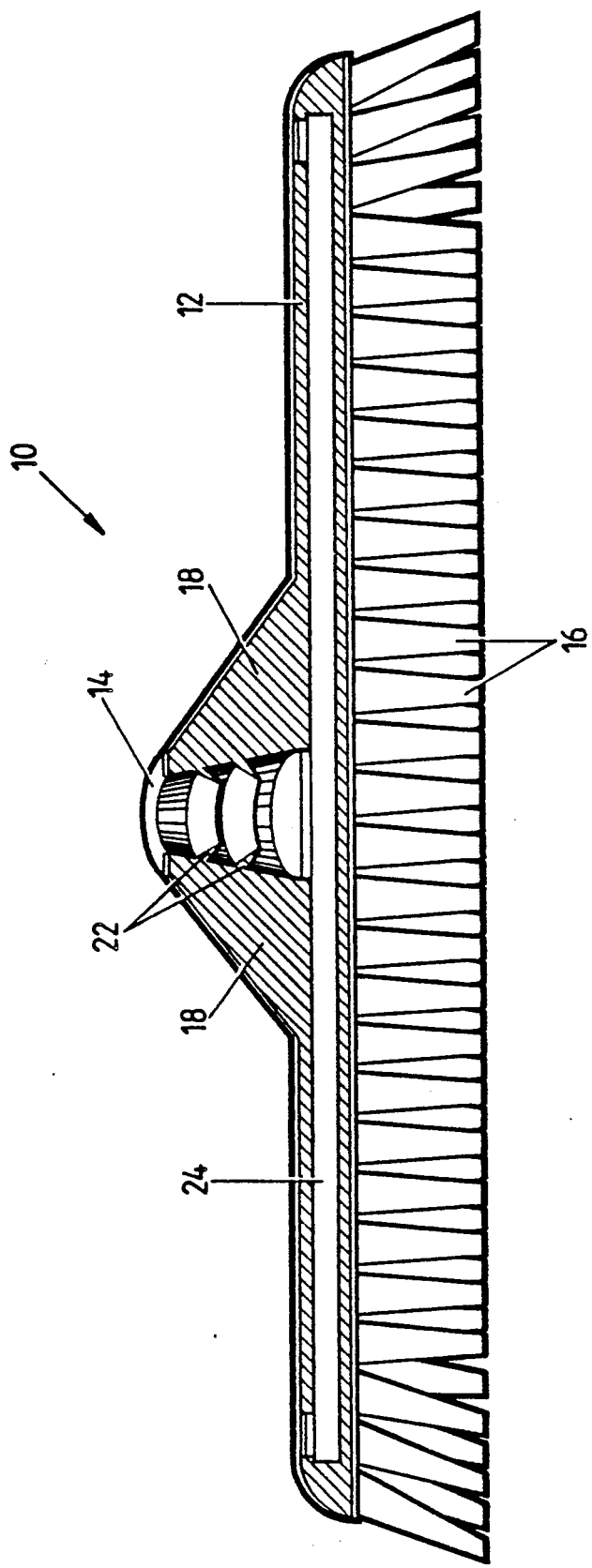
FIG. 2 is a part sectional elevation of the broom shown in FIG. 1.

As is shown in FIG. 2, the inside of the socket 14 is provided with downwardly projecting, substantially frusto-conically shaped and resiliently flexible ring formations 22 which counteract removal of the broomstick (not shown) from the socket 14 after it has been inserted therein. As will be appreciated, the formations 22 exercise a grip on the end of the broomstick which, together with a vacuum formed in the region of the bottom of the socket 14, when an attempt is made to remove the broomstick therefrom, constitute an excellent means for retaining the head 12 on the end of the broomstick.

The head 12, 12' the socket 14 and the bristles 16, 16', 26, 26' are all integrally moulded from a rubber compound formulated such as to ensure that the bristles are of appropriate hardness, stiffness, electrical conductivity, appearance and longevity for the purposes for which the broom is to be applied in use.

A stiffening member 24 in the form of a spring steel rod, is provided to improve the rigidity of the head 12.

Figure 3:
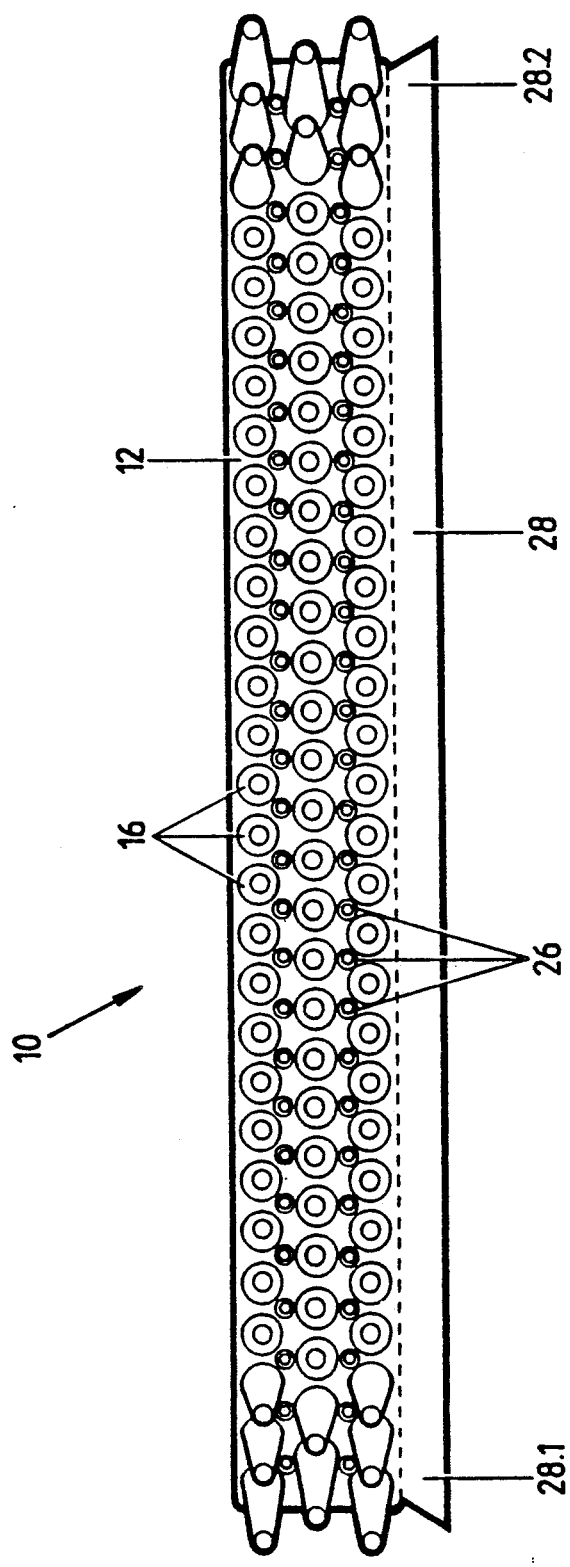
FIG. 3 is a bottom plan view of the broom shown in FIGS. 1 and 2.

Referring to FIGS. 2 and 3, it can be seen that the bristles are substantially frusto-conically shaped and are tapering in a direction away from the head 12. The free edges of the bristles 16 are chamfered.

the broom 10 comprises bristles of increased thickness 16 and bristles of reduced thickness 26 to respectively sweep dirt particles of larger or smaller individual mass. The thinner bristles 26 also facilitate the development of static electricity which in turn causes the individual bristles 26 to be charged and to attract the dirt particles. Such dirt particles may then subsequently be removed by rinsing the broom 10 under running water.

As can be seen in FIG. 3, the thicker bristles 16 are arranged in first rows, whilst the thinner bristles 26 are arranged in second rows, the second rows alternating with the first rows. It is also to be noted that the thicker bristles 16 of one first row are staggered in relation to the thicker bristles 16 of adjacent first rows. The thinner bristles 26 are not staggered in relation to one another.

Figure 4:
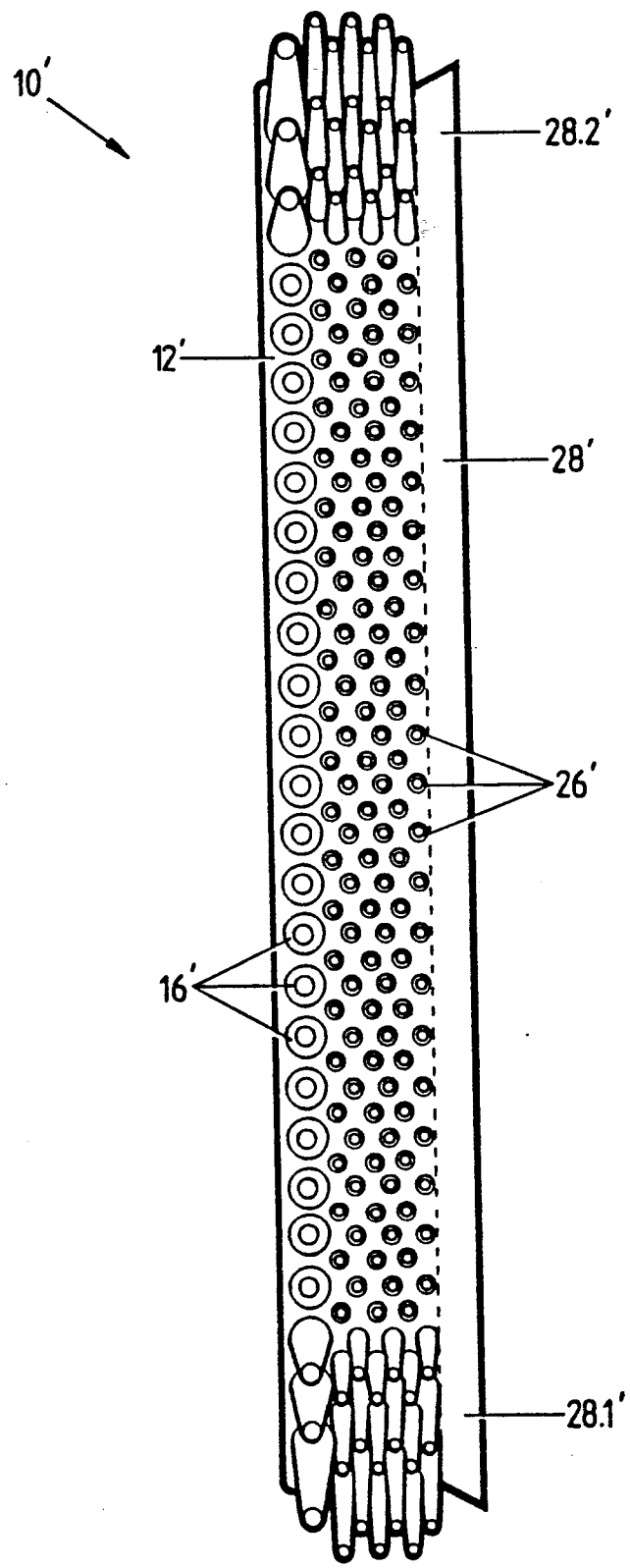
FIG. 4 is a bottom plan view of another embodiment of a broom showing an alternative arrangement of thicker and thinner bristles.

The thicker and thinner bristles could be arranged in many different ways, of which a preferred alternative is shown in FIG. 4. As can be seen in FIG. 4, the thicker bristles 16' are arranged in one first row extending longitudinally along one of the long sides of the head. Six second rows of thinner bristles 26' which are parallel to the first row, cover the remainder of the lower surface, the thinner bristles 26' of one second row being staggered in relation to the thinner bristles 26' of adjacent second rows.

Referring to FIGS. 1, 3 and 4, the head 12, 12' is provided with a longitudinally extending transversely projecting blade 28, 28' which is also integrally moulded with the head 12, 12', the socket 14 and the bristles 16, 26, 16', 26'. The blade 28, 28' is provided with angled corners 28.1, 28.2, 28.1', 28.2', each such corner being 60°.

The claims which follow are to be considered an integral part of the disclosure.

I claim:

1. A sweeping implement comprising an elongated head having an upper surface and a lower surface, a socket on the upper surface for attaching the head to a broomstick, and bristles projecting from the lower surface, the bristles, the socket and the head being in the form of an integral moulding of a polymeric material, the socket being provided with resiliently flexible retaining means on its inner surface for counteracting the removal of the broomstick from the socket, said retaining means comprising at least one substantially frusto-conically shaped ring tapering towards the base of the socket, the ring being adapted to form a vacuum which exercises a suction grip on the end of a broomstick inserted into the socket, when an attempt is made to remove the broomstick from the socket.

2. A sweeping implement as claimed in claim 1, in which the bristles comprise thinner bristles and thicker bristles, the thicker bristles being suitable for sweeping particles of larger individual mass than the thinner bristles and for supporting the thinner bristles in use, the thinner bristles being of substantially the same length as the thicker bristles.

3. A sweeping implement as claimed in claim 2, in which the thinner bristles promote the development of static electricity, causing dirt particles to be attracted thereto.

4. A sweeping implement as claimed in claim 2, in which the thicker bristles are arranged in first longitudinal rows along the head and the thinner bristles are arranged in second longitudinal rows along the head, the first and second rows alternating along the transverse dimension of the head, the thicker bristles of one first longitudinal row being staggered in relation to the thicker bristles of an adjacent first longitudinal row, and the thinner bristles of a second longitudinal row being arranged opposite, along the transverse dimension, the thinner bristles of an adjacent second longitudinal row.

5. A sweeping implement as claimed in claim 2, in which the thicker bristles are arranged in at least one first longitudinal row along one of the long sides of the head and the thinner bristles are arranged in at least two second longitudinal rows along the head on the remainder of the lower surface, the thinner bristles of one second longitudinal row being staggered in relation to the thinner bristles of an adjacent second longitudinal row.

6. A sweeping implement as claimed in claim 1, in which the head is provided with a longitudinally extending transversely projecting blade which is also integrally moulded with the head, the socket and the bristles, the blade being provided with angled corners at its free or distal side, the angles being in the range of between 45° and 90°.

7. A sweeping implement as claimed in claim 1, having a Shore hardness as measured on the A scale, of between 35 and 65 and an elongation at break of between 550% and 650%.

* * * * *